United States Patent [19]

Muto

[11] Patent Number: 5,523,987
[45] Date of Patent: Jun. 4, 1996

[54] DISC DRIVING APPARATUS CAPABLE OF REPRODUCING THE TRACK ADDRESS BY FORMING PHASE ERROR DATA USING WOBBLE PITS PEAK SUM SIGNAL

[75] Inventor: Takayasu Muto, Kanagawa, Japan

[73] Assignee: Sony Corporation, Tokyo, Japan

[21] Appl. No.: 280,289

[22] Filed: Jul. 26, 1994

[30] Foreign Application Priority Data

Jul. 27, 1993 [JP] Japan .................................. 5-185323

[51] Int. Cl.⁶ .................................................. G11B 7/00
[52] U.S. Cl. ................... 369/32; 369/48; 369/59; 369/124
[58] Field of Search .................... 369/32, 44.28, 369/44.34, 47–48, 50, 54, 58, 59, 111, 124; 360/51

[56] References Cited

U.S. PATENT DOCUMENTS

| 4,785,442 | 11/1988 | Ohtake et al. | 369/44.34 X |
|---|---|---|---|
| 5,249,169 | 9/1993 | Ogawa | 369/44.34 |
| 5,436,770 | 7/1995 | Wuto et al. | 360/51 |

FOREIGN PATENT DOCUMENTS 3-156774  7/1991  Japan .

OTHER PUBLICATIONS

Patent Abstracts of Japan, vol. 15, No. 395, P1260, Oct. 7, 1991, & JP3–156774.
Patent Abstracts of Japan, vol. 16, No. 272, P1373, Jun. 18, 1992, & JP4–69868.

Primary Examiner—W. R. Young
Attorney, Agent, or Firm—Limbach & Limbach

[57] ABSTRACT

A disc driving apparatus is disclosed. The disc driving apparatus is adapted for driving a disc-shaped recording medium of sampled servo system having predetermined servo patterns recorded at predetermined intervals thereon, each of the servo patterns including a clock pit formed at center of a track and at least two wobble pits, each being offset toward inner and outer peripheries of the disc-shaped recording medium. The disc driving apparatus includes: a reproducing unit for reproducing the servo patterns to output analog reproduction signals; an analog-to-digital converting unit for digitizing the analog reproduction signals in response to a channel clock signal; a phase error generating unit for generating a phase error signal by a predetermined process based upon a plurality of digital data forming digital reproduction signals; a peak detecting unit for detecting a sum signal representing a sum value of each peak level of the digital reproduction signals reproduced from the two wobble pits; a dividing unit for dividing the phase error signal by the sum signal to output divided phase error signal; and a channel clock generating unit for generating the channel clock signal phase-corrected in accordance with the divided phase error signal.

3 Claims, 5 Drawing Sheets

DISC DRIVING APPARATUS CAPABLE OF REPRODUCING THE TRACK ADDRESS BY FORMING PHASE ERROR DATA USING WOBBLE PITS PEAK SUM SIGNAL

BACKGROUND OF THE INVENTION

This invention relates to a disc driving apparatus for driving a disc-shaped recording medium, such as an optical disc, a magneto-optical disc or a magnetic disk, having plural servo patterns formed by wobble pits offset toward inner and outer circles of the recording track.

An optical disc of the sampled servo system as shown in the JP Patent Laid-Open (KOKAI) Publication No. 3-156774 has been conventionally known.

With an optical disc device of the sampled servo system, channel clocks, which are sampling clocks for data used in recording or reproduction, need to be phased correctly.

Figure 1:
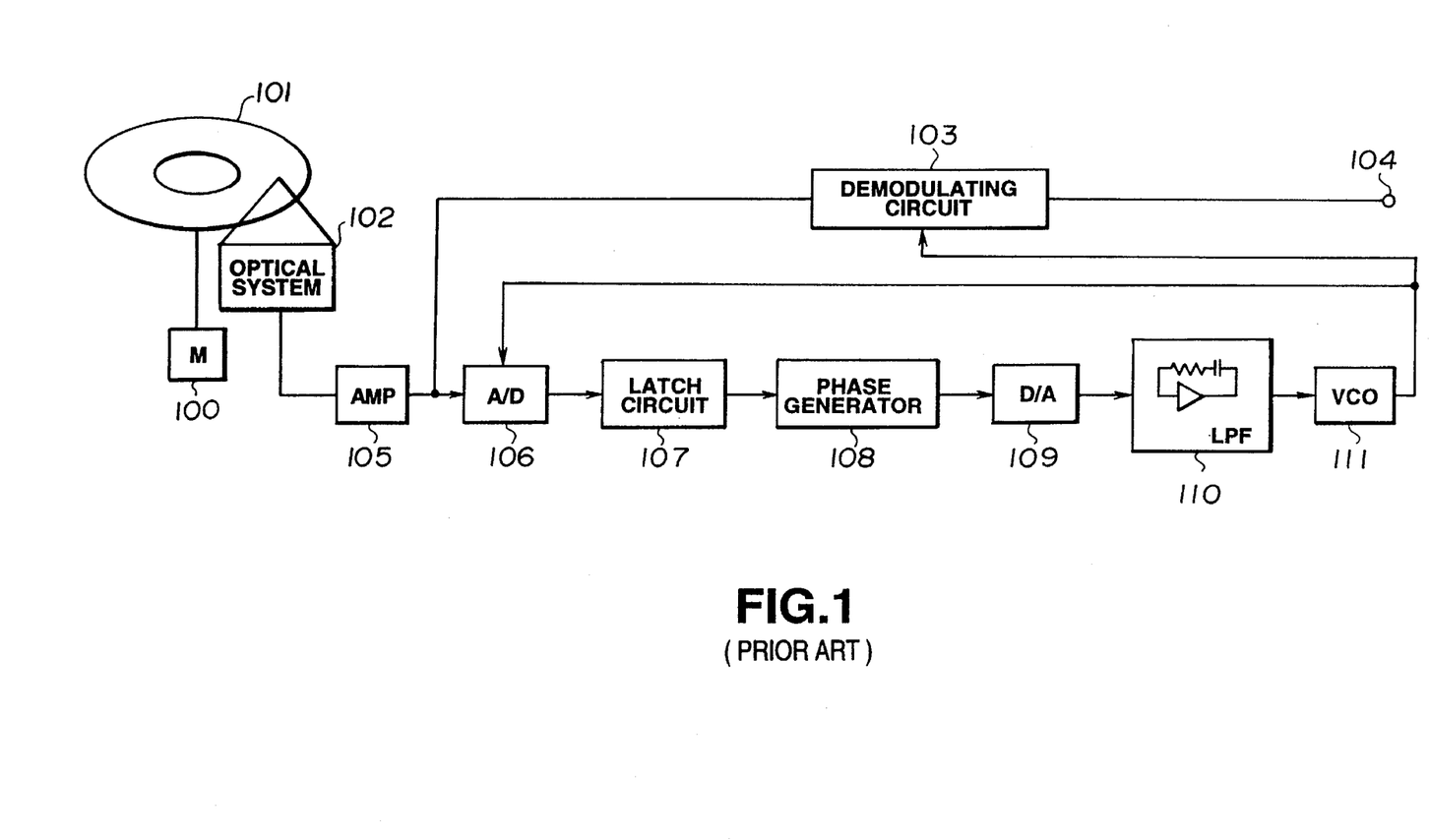
FIG. 1 is a block diagram showing a conventional magneto-optical disc driving apparatus.

FIG. 1 shows the structure of a clock detection system for the optical disc as applied to a driving apparatus for a magneto-optical disc.

Figure 2:
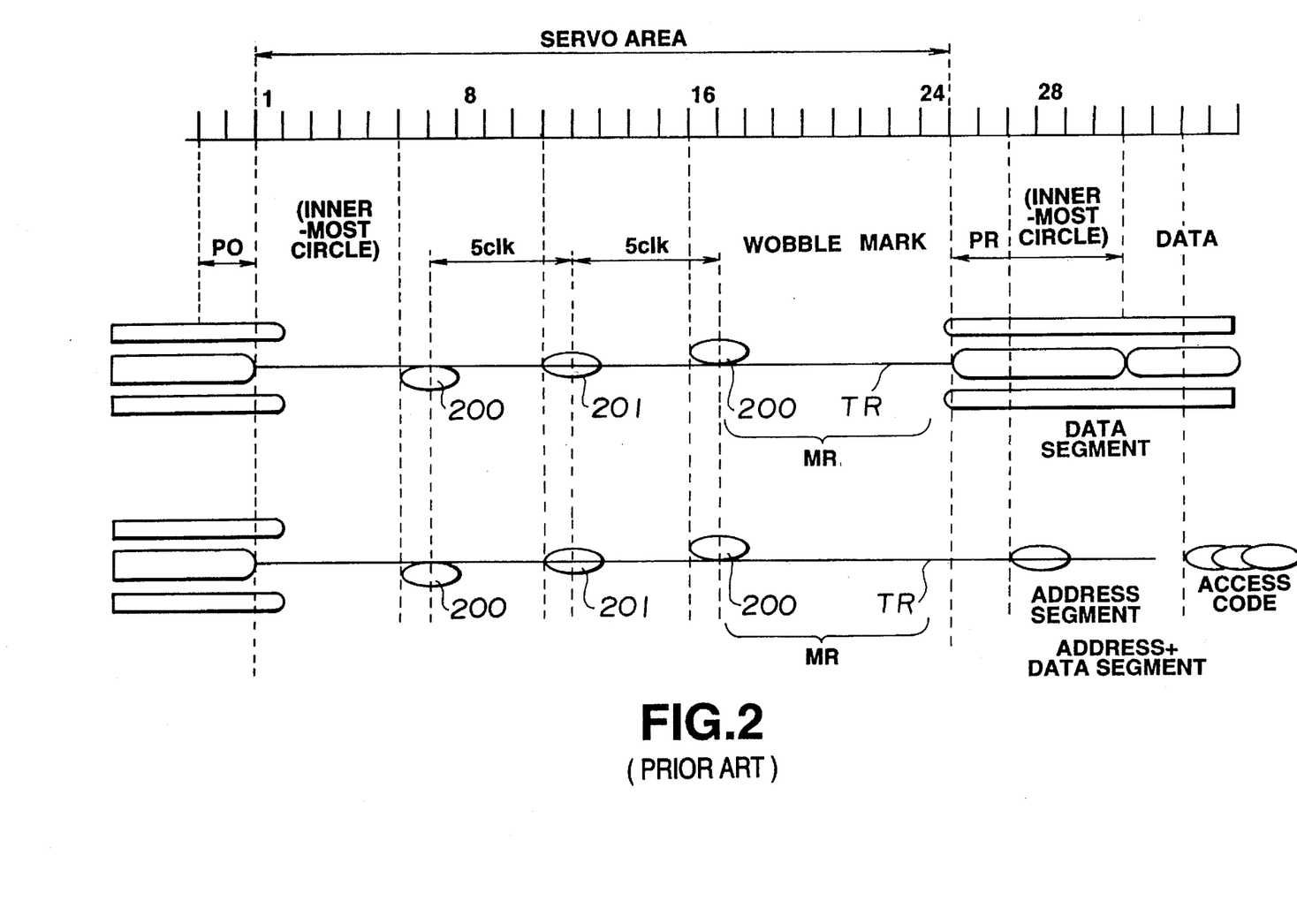
FIG. 2 is a view showing a servo pattern recorded on the magneto-optical disc.

The magneto-optical disc employed in this driving apparatus has a number of servo areas provided at predetermined intervals, each servo area having servo patterns recorded therein. Each of the servo patterns is comprised of a pair of wobble pits 200 offset toward the inner and outer circles from the center of a concentric track TR and a clock pit 201 formed at the center of the track TR and in an intermediate position between the wobble pits 200, as shown in FIG. 2.

In each circle of the track, 960 servo areas are formed with an area defined between a given servo area and the next servo area serving as a data area. Recording data modulated in a predetermined manner are photomagnetically recorded in the data area along with synchronization data, address data and the like.

Referring to FIG. 1, the driving apparatus for the magneto-optical disc commences a servo pattern detection mode, in which the magneto-optical disc 101 having the above-described format is driven in rotation by a spindle motor 100 at a constant angular velocity as in recording of the data., so as to phase-match the servo pattern detection data with the channel clocks.

In the servo pattern detection mode, an optical pickup 102 causes the magneto-optical disc 101 to be irradiated with a laser beam, and then detects a return light beam therefrom. The servo patterns and the recording data recorded on the magneto-optical disc 101 are reproduced by photoelectric conversion of the return light beam, generating reproduction signals which are then supplied to an amplifier 105.

The amplifier 105 amplifies the reproduction signals with a predetermined gain to supply the amplified reproduction signals to an A/D converter 106. The A/D converter 106 is provided with channel clocks of free-running frequency from a voltage controlled oscillator (VCO) 111 which has an oscillation frequency changed in response to the voltage supplied thereto. The A/D converter 108 samples and digitizes the reproduction signals by the channel clocks to form reproduction data, which is then supplied to a latch circuit 107.

Each of the servo patterns is made up of a pair of wobble pits 200 and a clock pit 201 located in an intermediate position between the wobble pits 200 and at the center of the track TR, as shown in FIG. 2. Therefore, the reproduction data of the servo patterns have such a waveform that waveform portions of the wobble pits 200 lower in level than a waveform portion of the clock pit 201 are on both sides of the waveform portion of the clock pit 201, with the waveform portion of the clock pit 201 as the center, as shown in FIG. 3.

On the assumption that the channel clock from the VCO 111 has a correct phase, counting of the channel clocks is started after the servo pattern is detected. When the count values are equal to 277 to 279, 282 to 284 and 287 to 289, the servo patterns can be latched correctly by latching the reproduction data from the A/D converter 106.

For this reason, a servo pattern detection circuit, not shown, compares a pre-stored servo pattern with the reproduction data from the A/D converter 108, so as to detect the servo pattern and transmit a detection pulse thereof to a counter, not shown. The counter is reset by the detection pulse of the servo pattern, and at this point, starts counting the channel clocks. The count values are supplied to a latch pulse outputting circuit. The latch pulse outputting circuit transmits a latch pulse to the latch circuit 107 when the count values are equal to 277 to 279, 282 to 284 and 287 to 289.

Figure 3:
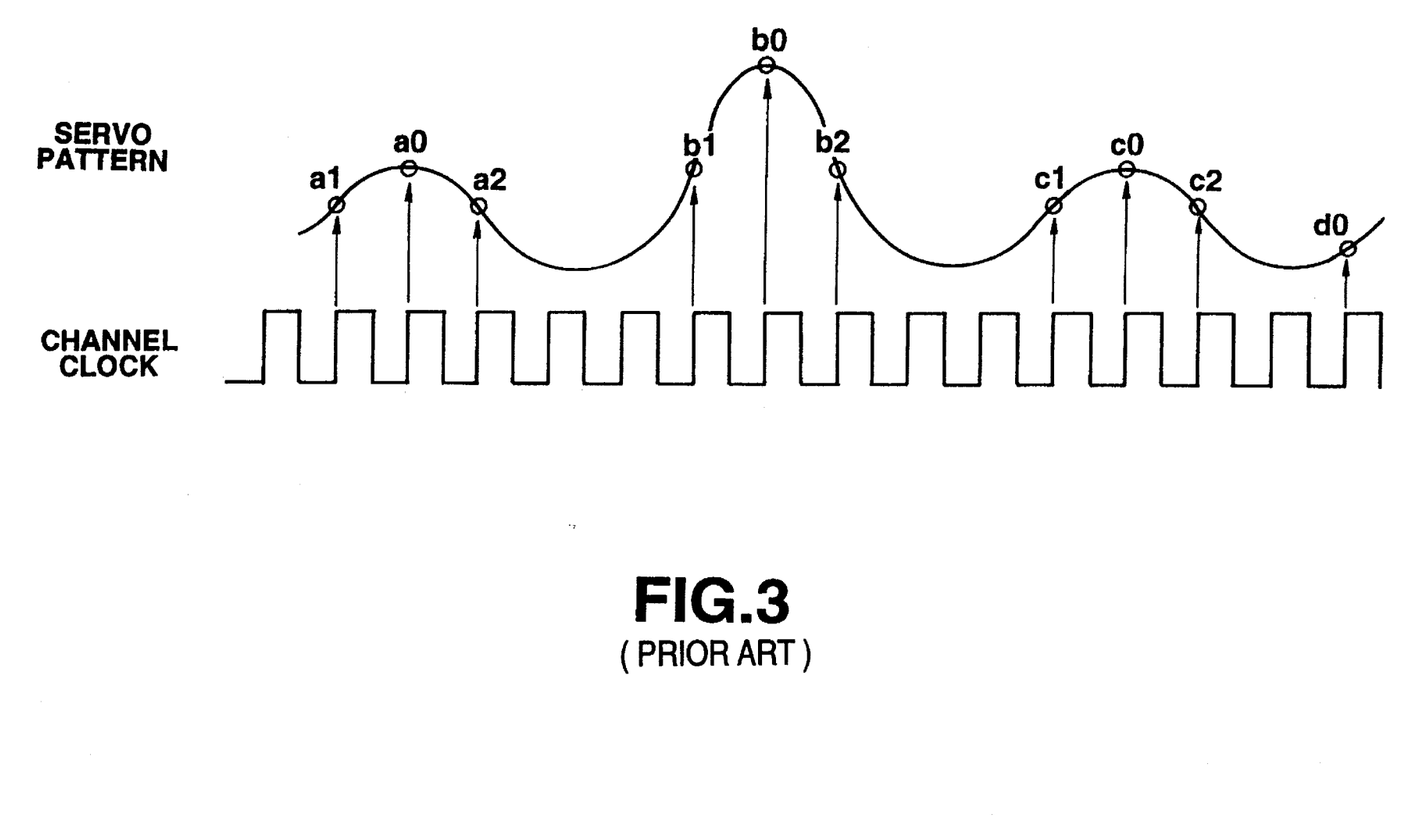
FIG. 3 is a view showing a reproduction waveform of the servo pattern.

The latch circuit 107 latches the reproduction data by each latch pulse to latch the reproduction data of the servo pattern, as shown in FIG. 3. The latch circuit 107 thus forms latch data at points a1, a0, a2, b1, b0, b2, c1, c0 and c2, and supplies these latch data to a phase generator 108.

The phase generator 108, thus provided with the reproduction data of the servo pattern, detects phase errors between the channel clocks and the servo pattern reproduction data, by the following Equation 1 based on level differences among points a1, a2, b1, b2, c1 and c2, which are shoulder points spaced apart by one channel clock ahead and behind the center points a0, b0 and c0, utilizing left-to-right symmetry of the three waveform portions.

$$\text{phase error detection data} = [(a2-a1)+(c2-c1)]/2 \qquad (1)$$

The phase generator 108 then supplies the resulting phase error detection data to a D/A converter 109.

The servo pattern reproduction data are employed for formation of tracking error signals, formation of tracking polarity signals (TPOL), which rise to a high level when an error is within ±¼ track from the track center, formation of one-eighth off-track signals, which rise to a high level when an error exceeds ±⅛ track from the track center, that is, when the value of a0 or c0 is greater than that of b0, formation of a mean level detection signal of the wobble pit, and formation of a level detection signal of a mirror area provided between the servo pattern and the data area, in accordance with the following Equations 2 to 6, respectively.

$$\text{tracking error signal} = c0-a0 \qquad (2)$$

$$\text{⅛ off-track signal} = (b0<a0)V(b0<c0) \qquad (3)$$

$$TPOL = b0 > (a0+c0)/2 \qquad (4)$$

$$\text{mean level detection signal of wobble pit} = (a0+c0)/2 \qquad (5)$$

$$\text{level detection signal of mirror area} = d0 \qquad (6)$$

The D/A converter 109 converts the phase error detection data into analog signals to form phase error detection signals, which are then supplied to a phase compensation circuit 110.

The phase compensation circuit 110, which is formed by a low-pass filter or the like, removes high-frequency noise components of the phase error detection signal for phase compensation of the phase error detection signals, and then supplies to the resulting signals to the VCO 111.

The VCO 111, which has its oscillation frequency varied in accordance with the phase error detection signals, feeds back to the A/D converter 106 channel clocks having such a frequency that the phase error of the channel clocks with respect to the servo pattern reproduction data is equal to zero.

As can be seen from the foregoing description, the section of the magneto-optical disc driving apparatus which forms the channel clock has the structure of a so-called phase-locked loop (PLL) which outputs channel clocks whose phase is synchronized with the phase of the servo pattern reproduction data.

When the channel clocks of the phase synchronized with the phase of the servo pattern reproduction data are ready to be outputted, that is, when the phase locking of the servo pattern reproduction data is terminated, the magneto-optical disc driving apparatus terminates the servo pattern detection mode to enter a reproduction mode for reproducing recording data recorded on the magneto-optical disc 101.

In the reproduction mode, the magneto-optical disc driving apparatus reads out the recording data recorded on the magneto-optical disc 101, using the optical pickup 102. As described above, the reproduction signals from the optical pickup 102 are supplied via the amplifier 105 to the A/D converter 108, and are supplied also to a demodulating circuit 103.

The A/D converter 108 forms the reproduction data based on the channel clocks, as described above, and supplies the reproduction data to the latch circuit 107. This allows the servo patterns to be latched to form the phase error detection data. On the basis of the phase error detection data, variable control of the oscillation frequency of the VCO 111 is conducted repeatedly.

The demodulating circuit 103 demodulates the reproduction signals from the amplifier 105 based on the channel clocks, and supplies the demodulated reproduction signals to a speaker, not shown, via an output terminal 104.

Since the channel clocks have the phase synchronized with that of the servo pattern detection data, as described above, the reproduction signals can be correctly sampled and demodulated by the demodulating circuit 103 to output correct reproduction signals.

Figure 4A:
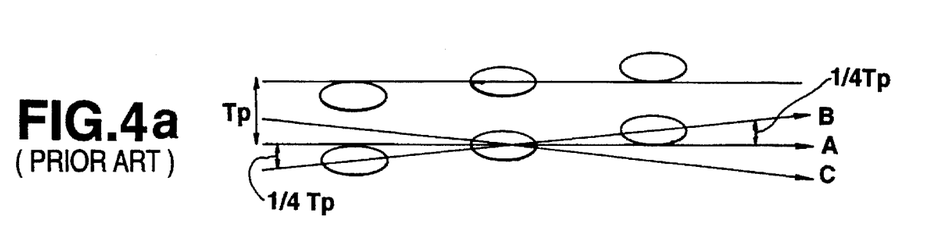
FIGS. 4a to 4d are views for explaining waveforms of the servo pattern in response to loci of a laser beam scanning the servo pattern.
Figure 4B:
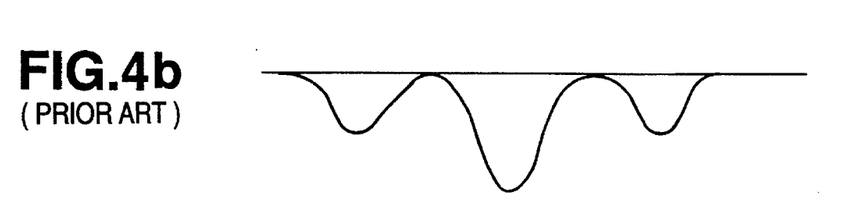

If the laser beam with which the magneto-optical disc 101 is irradiated is correctly on the track, the laser beam moves along a locus A shown in FIG. 4a. Thus, the substantially upper half of the first wobble pit, the entire clock pit and the substantially lower half of the next wobble pit are irradiated with the laser beam. For this reason, if the laser beam is correctly on the track, the servo pattern has a reproduction waveform such that waveform portions of the wobble pits lower in level than a waveform portion of the clock pit are on both sides of the waveform portion of the clock pit, as shown in FIG. 4b.

However, if the laser beam is not correctly on the track due to an external disturbance to the magneto-optical disc driving apparatus or due to a seek operation in which the optical pickup 102 is moved in the radial direction of the track to jump the track for access, the entire first wobble pit, the entire clock pit and the entire next wobble pit are irradiated with the laser beam, as shown by a locus B in FIG. 4a, or the entire clock pit is irradiated with the laser beam with the first and next wobble pits being scarcely irradiated with the laser beam, as shown by a locus C in FIG. 4a.

Figure 4C:
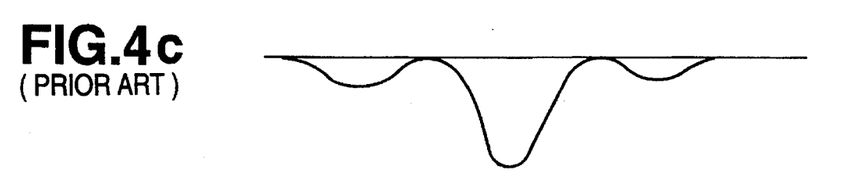
Figure 4D:
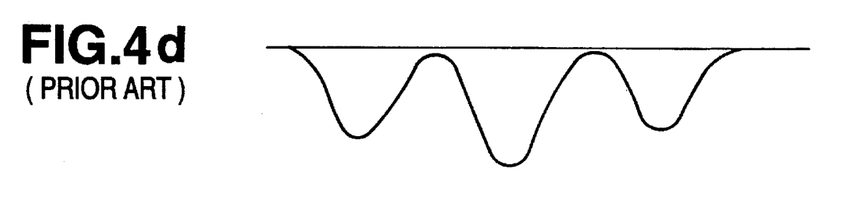

As the laser beam is not correctly on the track, as described above, the servo pattern may have a reproduction waveform such that the waveform portions of the clock pit and the wobble pits are substantially at the same level, as shown in FIG. 4d. The servo pattern may also have a reproduction waveform such that the waveform portions of the wobble pits are at an unusually low level with the waveform portion of the clock pit being at the normal level, as shown in FIG. 4c.

The phase error data for driving the VCO 111 is calculated by subtracting from the data the levels of both shoulders (a2, a1 and c2, c1) of the waveform portions of the wobble pits, adding the subtraction data, and dividing the addition data by 2, as shown by the Equation 1. Therefore, if the servo pattern has the unusual reproduction waveform due to the external disturbance or the seek operation, the addition data divided by 2 which normally indicates a constant value, that is, the phase error data, is changed to an unusual value. As the VCO 111 is driven by the phase error data of the unusual value, the PLL loop gain is fluctuated to cause an error in the channel clock phase. As a result, the track address cannot be reproduced correctly.

OBJECT AND SUMMARY OF THE INVENTION

In view of the above-described status of the art, it is an object of the present invention to provide a disc driving apparatus which is capable of correctly reproducing the track address by forming correct phase error data even though the laser beam is prevented from being correctly on the track by the external disturbance or the seek operation.

According to the present invention, there is provided a disc driving apparatus for driving a disc-shaped recording medium of sampled servo system having predetermined servo patterns recorded at predetermined intervals thereon, each of the servo patterns including a clock pit formed at center of a track and at least two wobble pits, each being offset toward inner and outer circles of the track. The disc driving apparatus includes a reproducing unit for reproducing the servo patterns to output analog reproduction signals, an analog-to-digital converting unit for digitizing the analog reproduction signals in response to a channel clock signal, a phase error generating unit for generating a phase error signal by a predetermined process based upon a plurality of digital data forming digital reproduction signals, a peak detection unit for detecting a sum signal representing a sum value of each peak level of the digital reproduction signals reproduced from the two wobble pits, a dividing unit for dividing the phase error signal by the sum signal to output divided phase error signal, and a channel clock generating unit for generating the channel clock signal phase-corrected in accordance with the divided phase error signal.

In the disc driving apparatus of the present invention, the reproducing unit is operative to seek in a radial direction of the disc-shaped recording medium. The disc driving apparatus further includes a selection unit for selectively outputting the divided phase error signal and the phase error signal to the channel clock generating unit, and a control unit for controlling the selection unit to output the divided phase error signal when the reproducing unit is in the seek operation.

In the disc driving apparatus of the present invention, the disc-shaped recording medium is an optical disc and the reproducing unit is an optical pickup.

In the disc driving apparatus of the present invention for driving a disc-shaped recording medium of sampled servo system having predetermined servo patterns recorded at predetermined intervals thereon, each servo pattern includes a clock pit formed at center of a track and at least two wobble pits, each being offset toward inner and outer circles of the track. Further, the peak detection unit detects the sum signal representing the sum value of each peak level of the digital reproduction signals reproduced from the two wobble pits. The dividing unit divides the phase error signal by the sum signal to output divided phase error signal. The channel clock generating unit generates phase-corrected channel clock signal in accordance with the divided phase error signal.

Thus, the values of the phase error signals supplied to the channel clock generating unit can be equalized to stably drive the channel clock generating unit, even though external disturbance in reproducing the recording data prevents the servo patterns from having correct reproduction waveforms.

In the disc driving apparatus of the present invention, the reproducing unit is operative to seek in the radial direction of the disc-shaped recording medium. The selection unit is for selectively outputting the divided phase error signal and the phase error signal to the channel clock generating unit, and the control unit is for controlling the selection unit to output the divided phase error signal when the reproducing unit is in the seek operation.

Thus, the values of the phase error signals supplied to the channel clock generating unit can be equalized to stably drive the channel clock outputting unit, even though the servo pattern cannot have correct waveforms in the seek operation.

DETAILED DESCRIPTION OF THE PREFERRED EMBODIMENTS

Preferred embodiments of the disc driving apparatus according to the present invention will now be described in detail with reference to the accompanying drawings.

Figure 5:
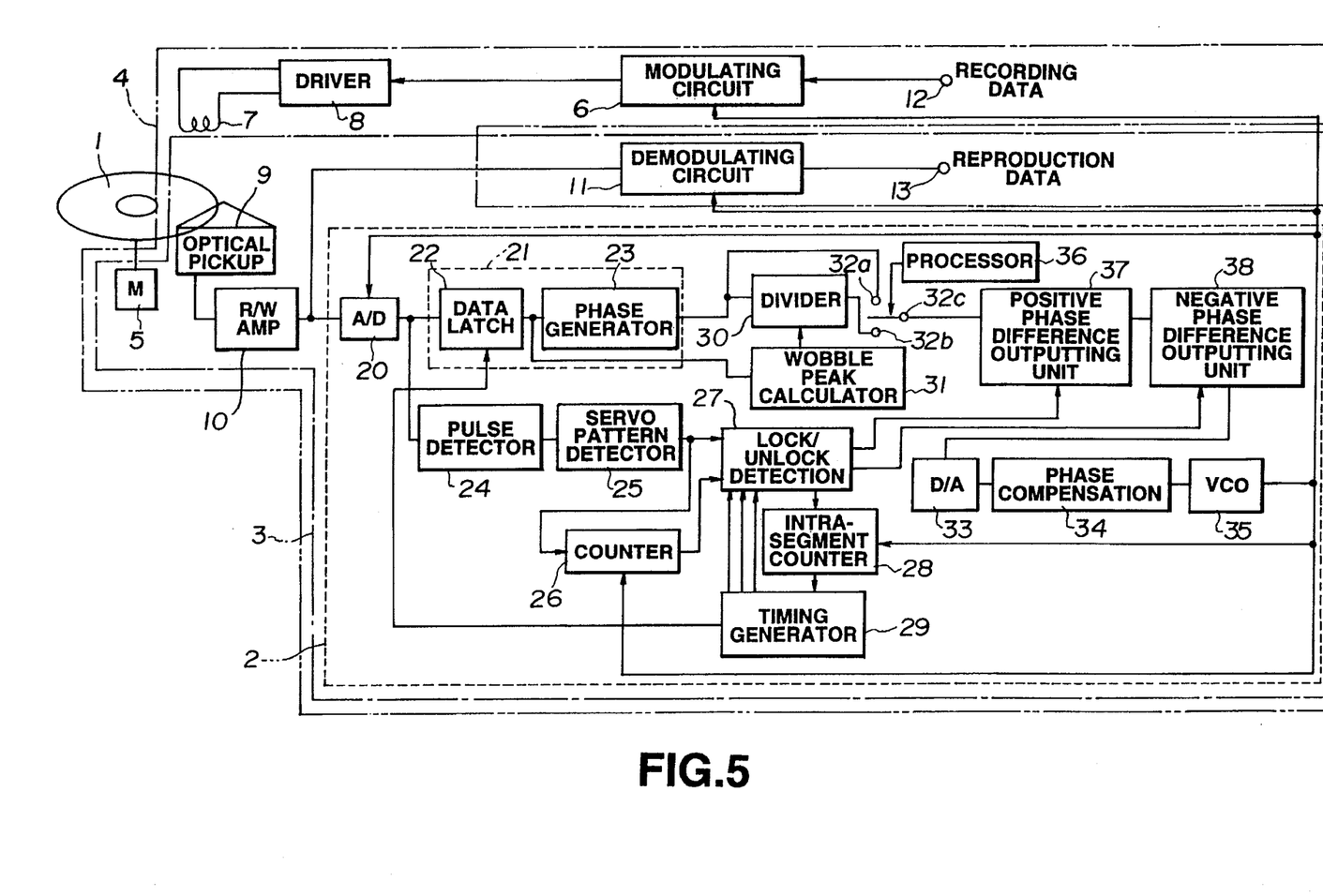
FIG. 5 is a block diagram showing an embodiment in which the disc driving apparatus of the present invention is applied to a magneto-optical disc driving apparatus.

The disc driving apparatus according to the present invention can be applied to a magneto-optical disc driving apparatus for driving a magneto-optical disc 1 provided as a disc-shaped recording medium, as shown in FIG. 5. Specifically, the disc driving apparatus of the present invention is applied to a reproducing system 3 shown by a surrounding dashed line and a recording system 4 shown by a surrounding double-dashed line in FIG. 5.

The magneto-optical driving apparatus shown in FIG. 5 is constituted of a channel clock forming unit 2 shown by a surrounding dotted line in FIG. 5, the reproducing system 3 for reproducing the recording data recorded in the magneto-optical disc 1 based on the channel clock from the channel clock forming unit 2, and the recording system 4 for recording data into the magneto-optical disc 1 based on the channel clock.

On the magneto-optical disc 1, a number of servo areas, each having pre-recorded thereon a servo pattern, are provided at predetermined intervals. The servo pattern has a pair of wobble pits 200 which are offset from the center of a concentric track TR toward inner and outer circles, and a clock pit 201 located at the center of the track TR and in an intermediate position between the wobble pits 200, as shown in FIG. 2. The servo patterns are formed at a rate of 960 patterns in each circle of the track TR and are not so-called unique patterns.

The area of the magneto-optical disc 1 other than the servo area is a data area. In the data area, synchronization data, address data and data actually required are alternately recorded, and data management is conducted on the basis of the synchronization data and address data. That is, the synchronization data are used for synchronization of a segment in which desired recording data are recorded on a predetermined basis, while the address data are used for recording and reproducing the recording data on a frame or a sector basis.

The recording system 4 is constituted of the channel clock forming unit 2, a spindle motor 5 for rotationally driving the magneto-optical disc 1 at a constant angular velocity, a modulating circuit 6 for modulating the recording data in a predetermined manner in response to the channel clocks from the channel clock forming unit 2, a driver 8 for driving a magnetic head 7, an optical pickup 9 for radiating a laser beam onto the magneto-optical disc 1, and a read/write (R/W) amplifier 10 for amplifying the reproduction signals from the optical pickup 9 and forming output pit signals.

The reproducing system 3 is constituted of the channel clock forming unit 2, the spindle motor 5, the optical pickup 9, the R/W amplifier 10, and a demodulating circuit 11 for demodulating the recording data reproduced by the optical pickup 9 at a timing as set by the channel clocks from the channel clock forming unit 2. The optical pickup 9 is so constituted as to be capable of conducting the seek operation to move in the radial direction of the disc.

The channel clock forming unit 2 has the structure of a so-called PLL circuit. In further detail, the channel clock forming unit 2 includes an A/D converter 20 for sampling pit signals from the R/W amplifier 10 with the channel clocks, then digitizing the sampled signals and forming output pit data, a phase data forming circuit 21 for detecting phase errors of the channel clocks with respect to the phase of the servo pattern based on the pit data from the A/D converter 20 to output phase error data, a pulse detector 24 for generating reproducing data from the pit data from the A/D converter 20 to output the resulting reproduction data, and a servo pattern detector 25 having the servo pattern pre-stored therein and adapted for detecting whether or not the reproducing data of the pulse detector 24 coincide with the prestored servo pattern data.

The phase data forming circuit 21 includes a data latch circuit 22 for latching the pit data with timing pulses as later explained and a phase generator 23 for performing arithmetic-logic operations as later explained on the basis of the pit data latched by the data latch circuit 22 to detect the phase errors.

The channel clock forming unit 2 also includes a positive phase difference outputting unit 37 for selectively outputting the phase error data supplied from the phase generator 23 or positive phase error data indicating that the channel clock is deviated in phase by a predetermined amount in a positive direction relative to the phase of the servo pattern detection data, a negative phase difference outputting unit 38 for selectively outputting the phase error data or negative phase error data indicating that the channel clock is deviated in phase by a predetermined amount in a negative direction relative to the phase of the servo pattern detection data, a counter 26 reset by a servo pattern detection pulse from the servo pattern detector 25 as a trigger and adapted for generating and outputting the first window pulse for detecting the servo pattern of the next segment by counting a predetermined number of the channel clocks, and a lock/unlock detection circuit 27 as the control unit for detecting the phase error of the channel clocks with respect to the detection data of the servo pattern based on the first window pulse from the counter 26 or a second window pulse as later explained and controlling the positive phase difference outputting unit 37 or the negative phase difference outputting unit 38 based on the detection results.

The channel clock forming unit 2 also includes an intra-segment counter 28 reset by servo pattern detection data on detection of a servo pattern in the window as indicated by the first window pulse in the lock/unlock detection circuit 27, to start counting the channel clocks, and a timing generator 29 for forming the second window pulse in response to the count value from the intra-segment counter 28 to supply the second window pulse to the lock/unlock detection circuit 27 and for forming latch pulses in response to the count value to supply the resulting latch pulses to the data latch circuit 22.

The channel clock forming unit 2 also includes a wobble peak calculator 31 for detecting peak values of the wobble pits 200 from the pit data supplied from the data latch circuit 22 and adding the peak values to form output addition data, a divider 30 for dividing the phase error data from the phase generator 23 by the addition data from the wobble peak calculator 31, a switch 32 provided with the phase error data from the phase generator 23 and the phase error data from the divider 30 and adapted for switching and outputting these data, and a processor 38 for detecting whether seek is in operation or not and switch-controlling the switch 32 in accordance with the detection results. Although not shown, the processor 38 controls the operation of the entire system, for, by controlling the optical pickup 9 to start the seek operation.

The channel clock forming unit 2 also includes a D/A converter 33 for converting the phase error data from the phase error forming circuit 21, the phase error data from the positive phase difference outputting unit 37 or the phase error data from the negative phase difference outputting unit 38, into analog signals and outputting the resulting analog signals, a phase compensation circuit 34 made up of a low-pass filter for phase-compensating the phase error signals from the D/A converter 33 and outputting the resulting phase-compensated phase error signals, and a voltage-controlled oscillator (VCO) 35 for forming channel clocks having the frequency changed on the basis of the phase error signals from the phase compensation circuit 34 to supply the resulting channel clocks to the modulating circuit 6 of the recording system 4 and to the demodulating circuit 11 of the reproducing system 3.

The operation of the magneto-optical disc driving apparatus of the present embodiment having the above-described structure will now be explained.

Prior to the recording/reproducing of the recording data, the magneto-optical disc driving apparatus commences a servo pattern detection mode in which the channel clock forming unit 2 performs phase matching between the servo pattern detection data and the channel clocks.

In the servo pattern detection mode, the spindle motor 5 is rotationally driven at a constant angular velocity or a constant linear velocity. Thus, the magneto-optical disc 1 is rotationally driven with the rotation of the spindle motor 5. The optical pickup 9 radiates a weak laser beam for reproduction onto the rotationally driven magneto-optical disc 1 and detects the return light. By photoelectrically converting the return light, the servo pattern and the recording data recorded on the magneto-optical disc 1 are reproduced, and these reproduction signals are supplied as pit signals to the R/W amplifier 10.

The R/W amplifier 10 amplifies the pit signals with a predetermined gain to supply the amplified signals to the A/D converter 20. The A/D converter 20 is provided with the channel clocks from the voltage-controlled oscillator (VCO) 35 having the oscillation frequency changed in response to the voltage supplied thereto. The A/D converter 20 generates pit data by sampling the pit signals with the channel clocks and digitizing the resulting signals, and supplies the resulting pit data to the data latch circuit 22 and to the pulse detector 24.

The pulse detector 24 finds a differential value of the pit data to detect the pit data corresponding to a point of inflection from a positive gradient to a negative gradient of the waveform shown in FIG. 3, and forms a data string in which the value of the detected pit data is "1" with other pit data being "0". The reproduction data composed of the pit data string are supplied to the servo pattern detector 25.

The data having the same pattern as the servo pattern formed on the magneto-optical disc 1 is pre-stored in the servo pattern detector 25. The servo pattern detect, or 25 compares the data of the pre-stored servo pattern with the reproduction data, and supplies a servo pattern detection pulse to the counter 26 and the lock/unlock detection circuit 27 when the two compared data are coincident with each other.

The counter 26 is provided with the channel clocks from the VCO 35. The counter 26 resets the count value using the servo pattern detection pulse as a trigger and starts counting the channel clocks at the point of reset.

If the channel clocks outputted from the VCO 35 are of the correct phase, the time from the point at which the servo pattern detection pulse is supplied to the lock/unlock detection circuit 27 to the point at which the servo pattern detection pulse is supplied next is equal to the time for 296 channel clocks, that is, the reproduction time for one segment, in the present embodiment. For this reason, the counter 26 predicts the time when the next servo pattern detection pulse is supplied to the lock/unlock detection circuit 27, based on the count value. When the count value reaches 296, which is the predicted time, the counter 26 generates the first window pulse and supplies the resulting pulse to the lock/unlock detection circuit 27.

The lock/unlock detection circuit 27 supplies a detection pulse to the intra-segment counter 28 if the circuit 27 is provided with a servo pattern detection pulse while the first window pulse is supplied thereto.

Similar to the counter 26, the intra-segment counter 28 is provided with the channel clocks from the VCO 35, and resets the count value using the servo pattern detection pulse from the lock/unlock detection pulse as a trigger. The intra-segment counter 28 newly starts counting the channel clocks at the point when the count value is reset, and supplies the count values to the timing generator 29.

The timing generator 29 generates latch pulses when the count values supplied from the intra-segment counter 28 reach 277, 278 and 279 clocks, 282, 283 and 284 clocks, and 287, 288 and 289 clocks, respectively, and supplies the latch pulses to the data latch circuit 22.

Since the servo pattern is constituted of a pair of wobble pits 200 and the clock pit 201 located at the center of the track TR in an intermediate position between the wobble pits 200, as shown in FIG. 2, the waveform of the reproduction data of the servo pattern is composed of a waveform portion for the clock pit 201 and waveform portions for the wobble pits 200 which are lower in level than the waveform portion for the clock pit 201, and which are on both sides of the waveform portion of the clock pit 201, as shown in FIG. 3.

The data latch circuit 22 latches the pit data from the A/D converter 20 with latch pulses supplied thereto when the count values from the intra-segment counter 28 are equal to 277 to 279, 282 to 284 and to 287 to 289, respectively. Thus, the data latch circuit 22 forms latch data a1, a0, a2, b1, b0, b2, c1, c0, c2, and supplies the latch data to the phase generator 23.

The phase generator 23, thus provided with the servo pattern replay data, finds the phase errors of the channel clocks with respect to the servo pattern reproduction data, in accordance with the following Equation 7 based on the level differences from points a0, b0 and c0, the center points of their respective waveform portions, to points a1, a2, b1, b2, and c1, c2, the shoulder points spaced apart by one channel clock ahead and behind the center points a0 to c0, as shown in FIG. 3, by utilizing left-to-right symmetry of the three waveform portions.

$$\text{phase error data} = [(a2-a1)+ (c2-c1)]/2 \qquad (7)$$

The phase generator 23 then transmits the resulting phase error data to the divider 30 and to a selected terminal 32a of the switch 32.

Also, the timing generator 29 predicts plural time points when the servo pattern detection pulse will be next supplied to the lock/unlock detection circuit 27, based on count values from the intra-segment counter 28. The timing generator 29 then supplies the second window pulse to the lock/unlock detection circuit 27 at the predicted time point, that is, when the count value reaches 296 clocks.

If the output channel clocks from the VCO 35 are of a correct phase, the reproduction time for one segment, that is, the time from the point at which the servo pattern detection pulse is supplied to the lock/unlock circuit 27 to the point at which the next servo pattern detection pulse is supplied thereto, is equal to the time for 298 channel clocks. Thus, if the lock/unlock detection circuit 27 is provided with the servo pattern detection pulse from the servo pattern detector 25 while the second window pulse is supplied thereto at the time when the count value is equal to 295, the lock/unlock detection circuit 27 determines that the channel clock phase is delayed significantly from the servo pattern reproduction data, and supplies a high-level selection signal to the positive phase difference outputting unit 37.

The positive phase difference outputting unit 37 is constituted of a selector. The positive phase difference outputting unit 37, provided with the high-level selection signal, transmits to the D/A converter 33 positive phase error data indicating that the channel clock phase is deviated by a predetermined value in the positive direction with respect to the phase of the servo pattern detection data, instead of the phase error data from the phase generator 23.

If the lock/unlock detection circuit 27 is provided with the servo pattern detection pulse from the servo pattern detector 25 while the second window pulse is supplied at the time when the count value is equal to 298, the lock/unlock detection circuit 27 determines that the phase error data generated by the phase generator 23 is proper. In this case, the lock/unlock detection circuit 27 supplies a low-level selection signal to the positive phase outputting unit 37 and to the negative phase outputting unit 38.

The positive phase outputting unit 37 and the negative phase outputting unit 38, provided with the low-level selection signal, supply the phase error data from the switch 32 directly to the D/A converter 33.

If the lock/unlock detection circuit 27 is provided with the servo pattern detection from the servo pattern detector 25 while the second window pulse is supplied at the time when the count value is equal to 297, the lock/unlock detection circuit 27 determines that the channel clock phase is significantly advanced from the servo pattern reproduction data, and supplies a high-level selection signal to the negative phase difference outputting unit 38.

The negative phase difference outputting unit 38, provided with the high-level selection signal, transmits to the D/A converter 33 negative phase error data indicating that the channel clock phase is deviated by a predetermined value in the negative direction with respect to the phase of the servo pattern detection data, instead of the phase error data from the phase generator 23.

In the servo pattern detection mode, the switch 32 is controlled by the processor 36 so as to select the selected terminal 32a with a selecting terminal 32c. For this reason, in this servo pattern detection mode, the phase error data from the phase generator 23 is supplied to the positive phase difference outputting unit 37 via the switch 32.

The D/A converter 33 converts the phase error data into analog data to form phase error signals, and supplies these phase error signals to the VCO 35 via the phase compensation circuit 34.

The VCO 35 generates channel clocks such that the phase errors indicated by the phase error signals are zero, and feeds the resulting channel clocks back to the A/D converter 20 and also to the counter 26 and the intra-segment counter 28.

As the phase locking of the servo pattern detection data is terminated, the servo pattern detection mode ends. The magneto-optical disc driving apparatus commences a designated mode selected from the recording mode and the reproduction mode.

If the recording mode is designated, the magneto-optical disc driving apparatus radiates an intense laser beam from the optical pickup 9 for recording onto the magneto-optical disc 1 which is rotationally driven at a constant angular velocity. Thus, the portion of the magneto-optical disc 1 which is irradiated with the laser beam is heated to the so-called Curie point, thereby losing its coercive force.

In this recording mode, the recording signals are supplied to the modulating circuit 6 via an input terminal 12. The modulating circuit 6, provided with the channel clocks from the VCO 35, forms the recording data by modulating the recording signals in a predetermined manner in response to the channel clocks and supplies the resulting recording data to the driver 8. The driver 8 drives the magnetic head 7 in response to the recording data. Thus, a modulated magnetic field in accordance with the recording data is applied from the magnetic head 7 to the portion irradiated with laser beam of the magneto-optical disc 1. Since the portion irradiated with the laser beam has lost its coercive force, the recording data is recorded onto the magneto-optical disc 1 by applying to the irradiated portion the modulated magnetic field in response to the recording data from the magnetic head 7.

In this recording mode, the pit data generated by the A/D converter 20 and latched with latch pulses from the timing generator 29 by the data latch circuit 22 is supplied to the phase generator 23 and to the wobble peak calculator 31.

The phase generator 23 generates phase error data from the pit data and supplied the resulting phase error data to the selected terminal 32a of the switch 32 and to the divider 30.

The wobble peak calculator 31 detects both peak values a0 and c0 of the reproduction waveform portions of the wobble pits 200 shown in FIG. 3 and a level d0 of the mirror area (MR) shown in FIG. 2, from the pit data. The wobble peak calculator 31 then performs the operation shown by the following equation to generate addition data and supplies the resulting addition data to the divider 30.

$$\text{addition data} = (a0-d0) + (c0-d0)$$

The divider 30 divides the phase error data from the phase generator 23 by the addition data, and supplies the divided phase error data to the selected terminal 32b of the switch 32.

The processor 36 normally controls the switch 32 so as to select the selected terminal 32a with the selecting terminal 32c However, if the magneto-optical disc driving apparatus suffers external disturbance or operates in the seek mode, the processor 36 detects the external disturbance or the seek operation and controls the switch 32 so as to select the selected terminal 32b with the selecting terminal 32c.

Thus, the VCO which was driven by the phase error data from the phase generator 23 is now driven by the phase error data divided by the divider 30.

When the external disturbance occurs or the seek mode is in operation, the laser beam with which the magneto-optical disc 1 is irradiated is off the track, causing the reproduction waveform of the servo pattern to be unusual in comparison to the reproduction waveform of the servo pattern reproduced at the time when the laser beam is on the track. The unusual waveform is exemplified by a reproduction waveform having unusually small waveform portions of the wobble pits 200, or a reproduction waveform in which the waveform portions of the wobble pits 200 and the waveform portion of the clock pit 201 are substantially at the same level.

However, the wobble peak calculator 31 detects both peak values of the wobble pits 200 and adds the peak values, and the divider 30 divides the phase error data from the phase generator 23 by the addition data. Thus, the phase error data can be divided by addition data of a large value as the reproduction waveform portions of the wobble pits 200 are enlarged, while the phase error data can be divided by addition data of a small value as the reproduction waveform portions of the wobble pits 200 are enlarged. Therefore, the phase error data can be equalized.

For this reason, the VCO 35 can be stably driven and the track address can be correctly reproduced while preventing the phase error from being generated in the channel clock, even when the external disturbance occurs or the seek mode is in operation. Consequently, the recording data can be correctly recorded in the magneto-optical disc 1.

The recording data thus recorded in the magneto-optical disc 1 is reproduced in the reproduction mode.

As the reproduction mode is designated, the optical pickup 9 radiates a weak laser beam for reproduction onto the magneto-optical disc 1 to capture a return light beam. The magneto-optical disc driving apparatus thus reproduces the recording data recorded on the magneto-optical disc 1 from the return light beam, and then supplies the reproduction signals to the demodulating circuit 11 via the R/W amplifier 10.

The demodulating circuit 11 demodulates the reproduction signals with the channel clocks from the VCO 35, and outputs the demodulated reproduction signals via an output terminal 13.

In this reproduction mode as in the recording mode, the processor 36 detects the occurrence of an external disturbance or a seek operation and controls the switch 32 so as to select the selected terminal 32b with the selecting terminal 32c. Thus, since the phase error data supplied to the VCO 35 can be equalized even though the laser beam is deviated off the track by an external disturbance or a seek operation, the VCO 35 can be stably driven, preventing the phase error from being generated in the channel clock. Consequently, the track address can be correctly reproduced and the recording data can be correctly reproduced.

Although the channel clock forming unit 2 has the structure of a digitally operating PLL in the above embodiment, it may have the structure of a PLL operating in an analog manner.

The channel clock forming unit 2 detects the servo patterns from the magneto-optical disc 1 having only the servo patterns recorded thereon by pit, so as to form the channel clocks. However, the channel clock forming unit 2 may also be so constituted as to detect the servo patterns from a magnetic disk having the servo patterns magnetically formed thereon, to form the channel clocks.

Thus, it is to be understood that the disc-shaped recording medium used in the disc driving apparatus according to the present invention may be selected from the a magneto-optical disc, an optical disc and a magnetic disk.

What is claimed is:

1. A disc driving apparatus for driving a disc-shaped recording medium of sampled servo system having predetermined servo patterns recorded at predetermined intervals thereon, each of the servo patterns including at least two wobble pits, each being offset toward inner and outer peripheries of the disc-shaped recording medium, the disc driving apparatus comprising:

reproducing means for reproducing the servo patterns to output analog reproduction signals;

analog-to-digital conversion means for digitizing the analog reproduction signals in response to a channel clock signal;

phase error generating means for generating a phase error signal by a predetermined process based upon a plurality of digital data forming digital reproduction signals;

peak detection means for detecting a sum signal representing a sum value of each peak level of the digital reproduction signals reproduced from the two wobble pits;

dividing means for dividing the phase error signal by the sum signal to output divided phase error signal; and channel clock generating means for generating the channel clock signal phase-corrected in accordance with the divided phase error signal.

2. The disc driving apparatus as claimed in claim 1, wherein the reproducing means is operative to seek in a radial direction of the disc-shaped recording medium, and further comprising selection means for selectively outputting the divided phase error signal and the phase error signal to the channel clock generating means, and control means for controlling the selection means to output the divided phase error signal when the reproducing means is in the seek operation.

3. The disc driving apparatus as claimed in claim 1, wherein the disc-shaped recording medium is an optical disc and the reproducing means is an optical pickup.

* * * * *